(12) United States Patent
Yang (10) Patent No.: US 7,437,744 B2
(45) Date of Patent: Oct. 14, 2008

(54) LOADING APPARATUS FOR DISC DRIVE

(75) Inventor: Chin-Sung Yang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 420 days.

(21) Appl. No.: 11/308,130

(22) Filed: Mar. 8, 2006

(65) Prior Publication Data
US 2007/0008856 A1    Jan. 11, 2007

(30) Foreign Application Priority Data
Jul. 9, 2005    (CN) .................. 2005 1 0035908

(51) Int. Cl.
*G11B 17/03* (2006.01)
(52) U.S. Cl. .................................. 720/607
(58) Field of Classification Search .......... 720/607, 720/608, 663; 369/75.21
See application file for complete search history.

(56) References Cited
U.S. PATENT DOCUMENTS

| | | | |
|---|---|---|---|
| 5,218,593 A | 6/1993 | Kaneo et al. | |
| 5,943,310 A * | 8/1999 | Song | 720/607 |
| 6,058,090 A | 5/2000 | Wang et al. | |
| 6,061,320 A | 5/2000 | Tsai | |
| 6,665,254 B2 | 12/2003 | Fukasawa | |
| 6,971,114 B2 | 11/2005 | Osada et al. | |
| 7,222,350 B2 * | 5/2007 | Ho et al. | 720/607 |
| 2005/0114872 A1 | 5/2005 | Liu | |
| 2005/0132388 A1 * | 6/2005 | Ho et al. | 720/607 |

FOREIGN PATENT DOCUMENTS

CN    1481484 A    3/2004

* cited by examiner

*Primary Examiner*—Allen T Cao
(74) *Attorney, Agent, or Firm*—Winston Hsu (57) ABSTRACT

A loading apparatus for a disc drive which has a traverse module for loading a disc thereon and reading from or recording to the disc including a gear for transmitting a motive force of a driving motor and a slider for lifting the traverse module up to load the disc. The slider forms a toothed portion engageable with the gear. The toothed portion includes a first rack segment and a second rack segment. The first rack segment is flexibly deformable so as to overcome a conflict of alignment of gear teeth of the gear and the first rack segment when such conflict occurs.

16 Claims, 7 Drawing Sheets

LOADING APPARATUS FOR DISC DRIVE

FIELD OF THE INVENTION

The present invention generally relates to a loading apparatus for a disc drive and, more particularly, to a loading apparatus for a disc drive with increased stability and reduced vibration during a loading procedure.

DESCRIPTION OF RELATED ART

As one of the most important parts of a disc drive, a loading apparatus is used to perform the loading and unloading of discs. A typical loading apparatus 900, referring to FIG. 7, includes a frame 99, a motor 98 as a power supply, a pulley-gear wheel 97, a duplicate gear 96, and a slider 95. The pulley-gear wheel 97, the duplicate gear 96, and the slider 95 are sequentially engaged with the motor 98 to transmit mechanical power and reduce rotational speed output by the motor 98.

Figure 7:
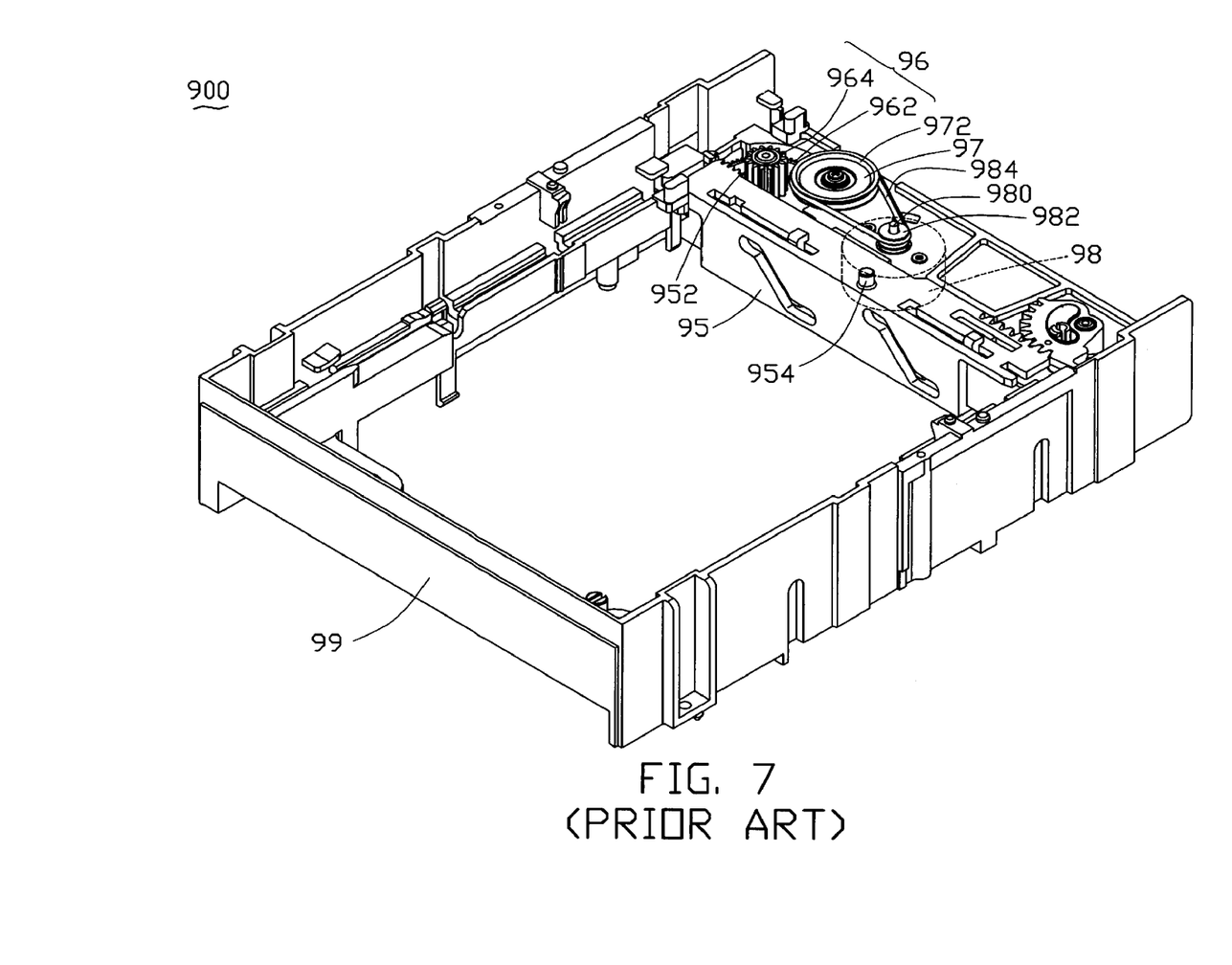
FIG. 7 is an isometric view of a conventional loading apparatus.

A first pulley 982 is arranged on a shaft 980 of the motor 98, and engages with a second pulley 972 of the pulley-gear wheel 97 via a belt 984. A first gear (not shown) of the pulley-gear wheel 97 is engaged with a second gear 962, while a third gear 964 of the duplicate gear 96 is engageable with both a rack 952 of the slider 95 and a rack of a tray (not shown). A guiding pin 954 is upwardly formed on the slider 95. The guiding pin 954 is engageable with a guiding slot (not shown) defined in a back of the tray. When a mechanical force is transmitted to the duplicate gear 96 during a loading procedure, the tray moves towards the frame 99, and the slider 95 moves along a direction of the rack 952 due to the engagement of the guiding slot and the guiding pin 954. As a result, the rack 952 gradually engages with the third gear 964 of the duplicate gear 96. However, during engagement of the rack 952 and the third gear 964, the teeth thereof may not mesh properly and destructive grinding can occur, due to inaccurate alignment of, or imbalance of the engaging parts.

Accordingly, a need exists for a loading apparatus in the industry to address the aforementioned deficiencies and inadequacies.

SUMMARY OF INVENTION

A loading apparatus for a disc drive which has a traverse module for loading a disc thereon and reading from or recording to the disc including a gear for transmitting a motive force of a driving motor and a slider for lifting the traverse module up to load the disc. The slider forms a toothed portion engageable with the gear. The toothed portion includes a first rack segment and a second rack segment. The first rack segment is flexibly deformable to overcome a conflict of alignment of gear teeth of the gear and the first rack segment when such conflict occurs.

Other systems, methods, features, and advantages of the present loading apparatus will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF DRAWINGS

Many aspects of the present loading apparatus can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe the preferred embodiments of the present loading apparatus, in detail.

Figure 1:
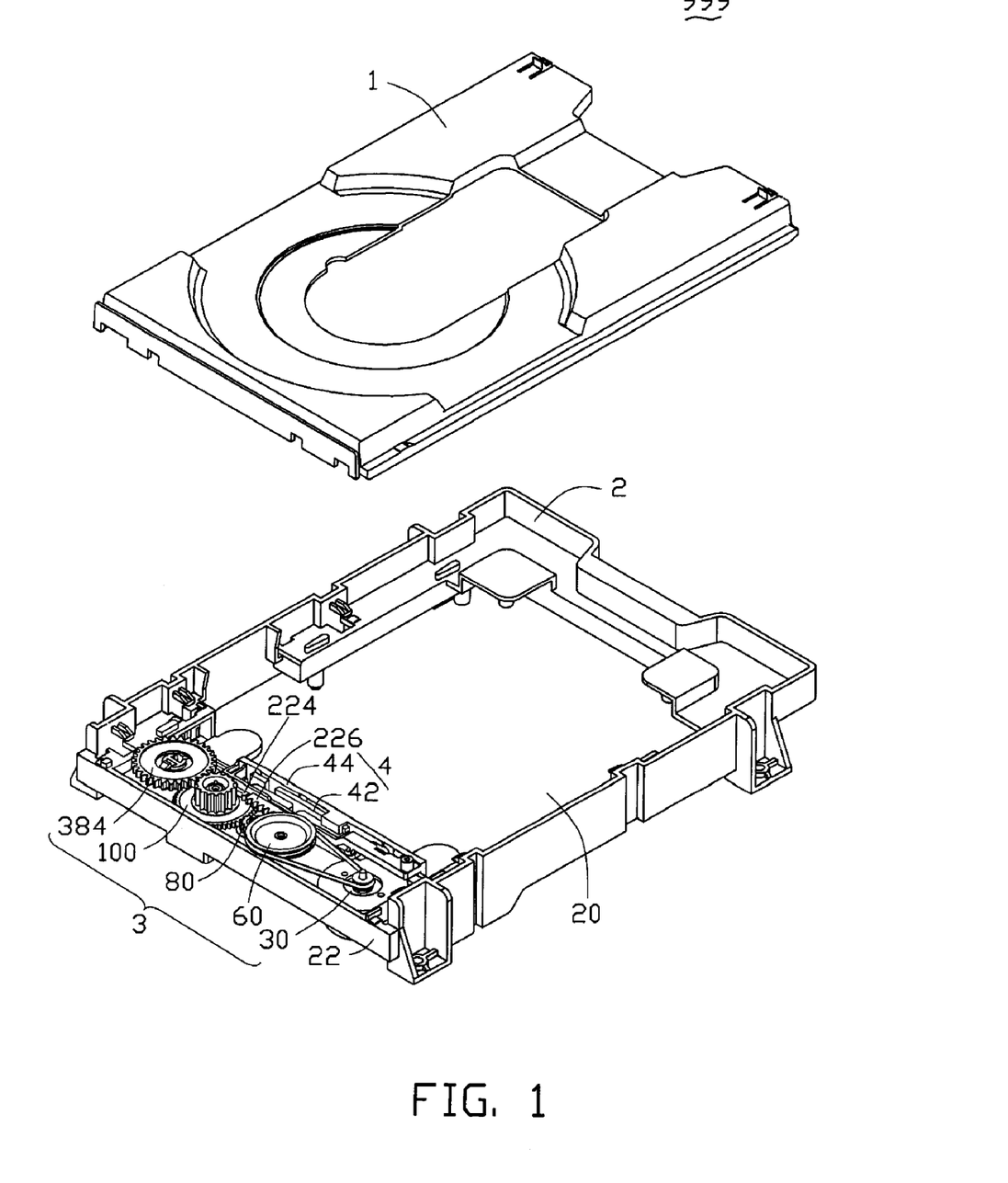
FIG. 1 is a partially exploded, isometric view of a loading apparatus in accordance with an exemplary embodiment thereof, the loading device including a tray, a transmission system, and a loading system.

Referring to FIG. 1, a loading apparatus 999, which is used to load and unload a disc for a disc drive (not shown), is illustrated to set up an exemplary embodiment. The loading apparatus 999 includes a tray 1, a frame 2, a transmission system 3, and a loading system 4. The tray 1 is slidably mounted to the frame 2, and is movable into or out from the frame 2 to convey a disc (not shown). The frame 2 is substantially rectangular, and defines a rectangular opening 20 in a center thereof. The transmission system 3 and the loading system 4 are mounted on a front beam 22 of the frame 2. The transmission system 3 and the loading system 4 are engageable with each other to perform transmission of mechanical energy.

Figure 2:
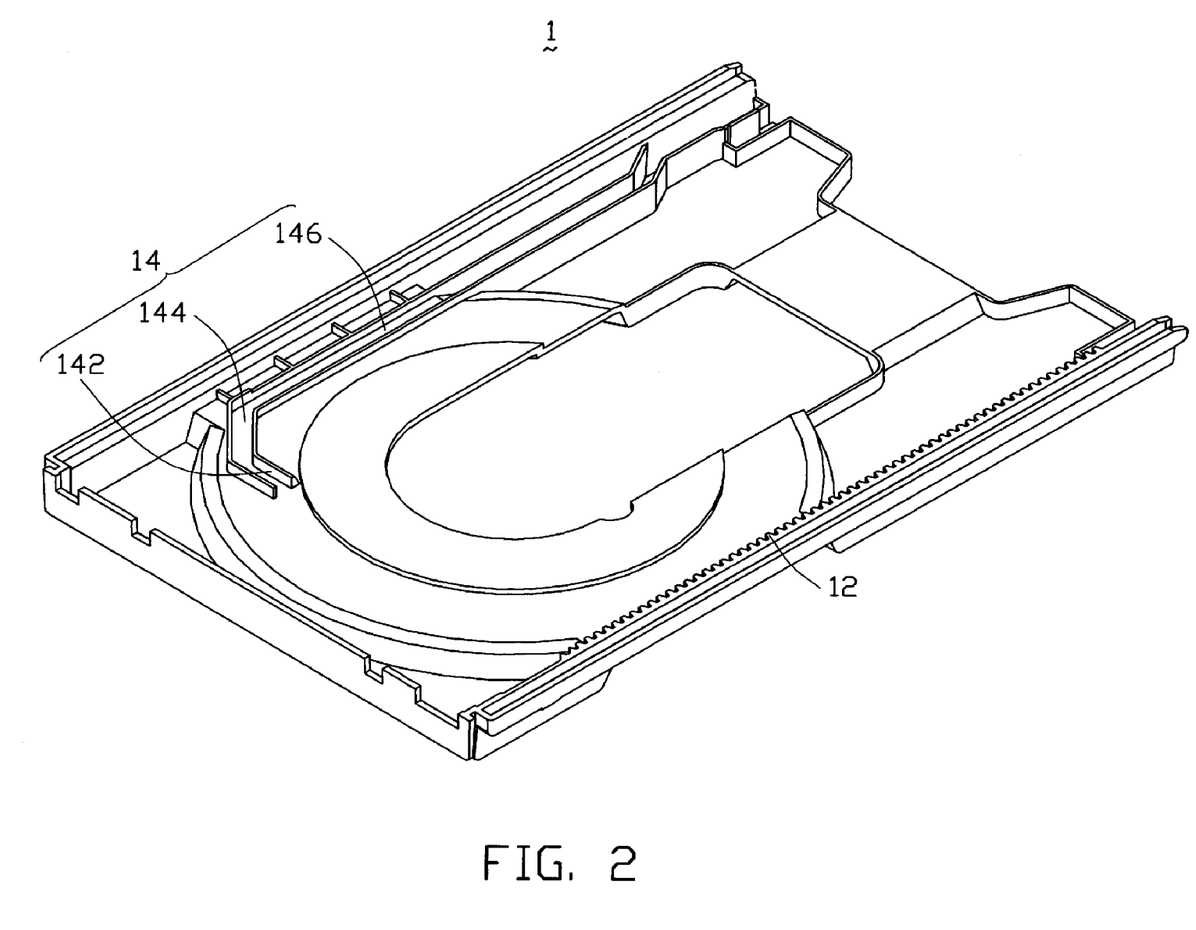
FIG. 2 is an enlarged, isometric view of the tray of FIG. 1, viewed from an inverted aspect.

Referring to FIG. 2, a rack rail 12 engageable with the transmission system 3 is formed at a lateral side of a bottom of the tray 1, while a guiding groove 14 engageable with the loading system 4 is defined at an opposite lateral side. The rack rail 12 substantially extends along a longitudinal direction of the tray 1. The guiding groove 14 includes a transverse portion 142 extending along a transverse direction of the tray 1, an inclined portion 144, and a longitudinal portion 146 extending along the longitudinal direction. The inclined portion 144 interconnects the transverse portion 142 and the longitudinal portion 146.

Figure 3:
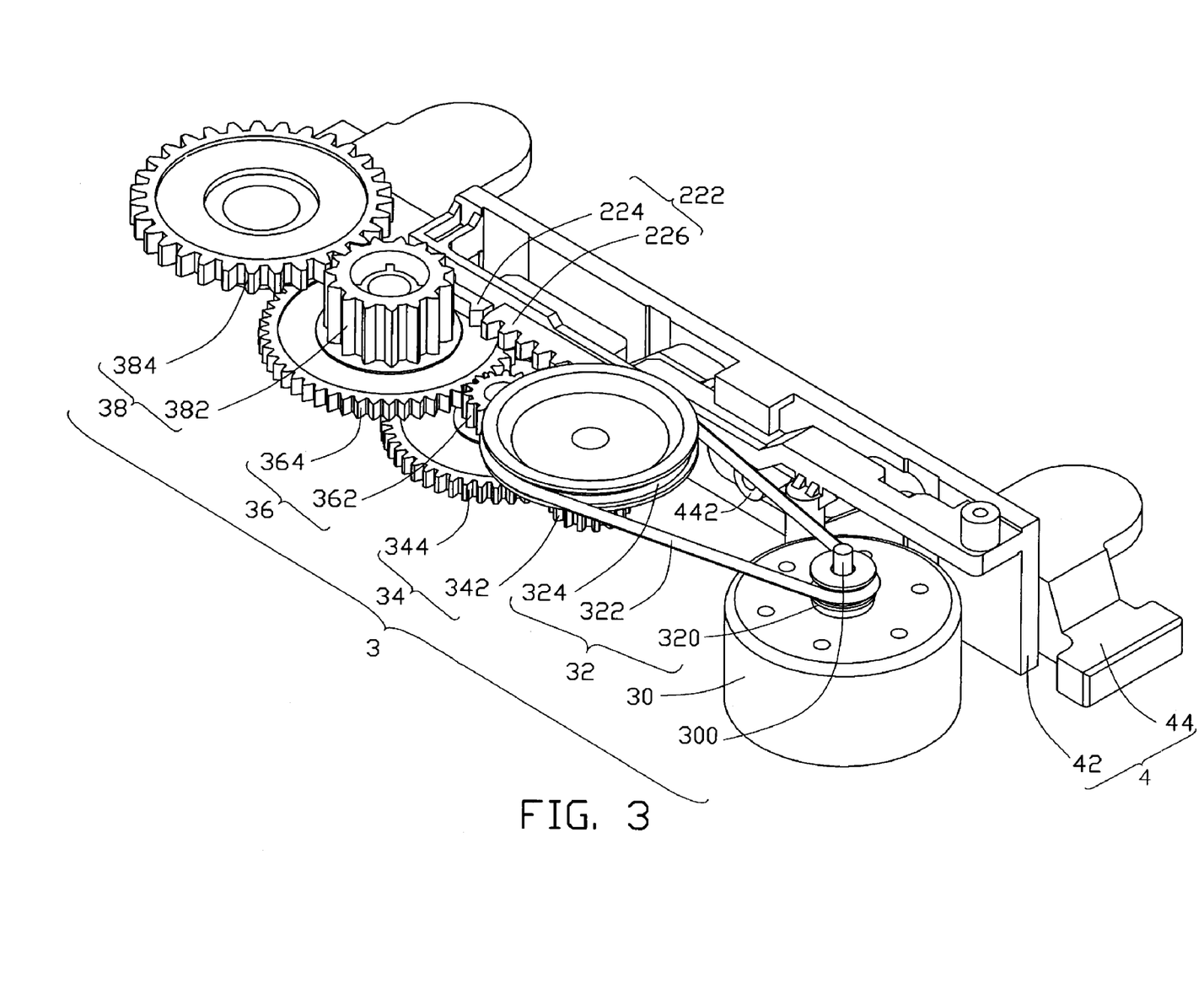
FIG. 3 is an enlarged, isometric view of the transmission system and the loading system of FIG. 1, the transmission system including a cam slider.

Referring also to FIG. 3, the transmission system 3 includes a driving motor 30 and four transmission units 32, 34, 36, 38 engaged with the driving motor 30. The four transmission units 32, 34, 36, 38 are sequentially engaged with each other. As a rotational speed output from the driving motor 30 is much higher than a speed needed during the loading procedure, the four transmission units 32, 34, 36, 38 perform as speed reduction transmission units.

The first transmission unit 32 is a pulley train, and includes a first pulley 320 secured on a spindle 300 of the driving motor 30, a belt 322, and a second pulley 324 engaged with the first pulley via the belt 322. The first transmission unit 32 contributes to the reduction of the rotational output speed of the transmission system 3, and the motive force is transmitted from the driving motor 30 to the second pulley 324.

The second transmission unit 34 is a gear train, and includes a first gear 342 meshing with a second gear 344. The first gear 342 is axially, integrally formed with the second pulley 324 of the first transmission unit 32 to form a first duplicate wheel 60 (referring to FIG. 1). The rotational speed of transmission system 3 is further reduced by the second transmission unit 34, and the motive force is transmitted from the first duplicate wheel 60 to the second gear 344.

The third transmission unit 36 is a gear train, and includes a third gear 362 meshing with a fourth gear 364. The third gear 362 is axially, integrally formed with the second gear 344 of the second transmission unit 34 to form a second duplicate wheel 80 (referring to FIG. 1). The rotational speed of transmission system 3 is further reduced by the third transmission unit 36, and the motive force is transmitted from the second duplicate wheel 80 to the fourth gear 364.

The fourth transmission unit 38 is a gear train, and includes a fifth gear 382 meshing with a sixth gear 384. The fifth gear 382 is axially, integrally formed with the fourth gear 364 of the third transmission unit 36 to form a third duplicate wheel 100 (referring to FIG. 1). The rotational speed of transmission system 3 is further reduced by the fourth transmission unit 38, and the motive force is transmitted from the third duplicate wheel 100 to the sixth gear 364. The sixth gear 384 engages with the rack rail 12 of the tray 1.

Figure 4:
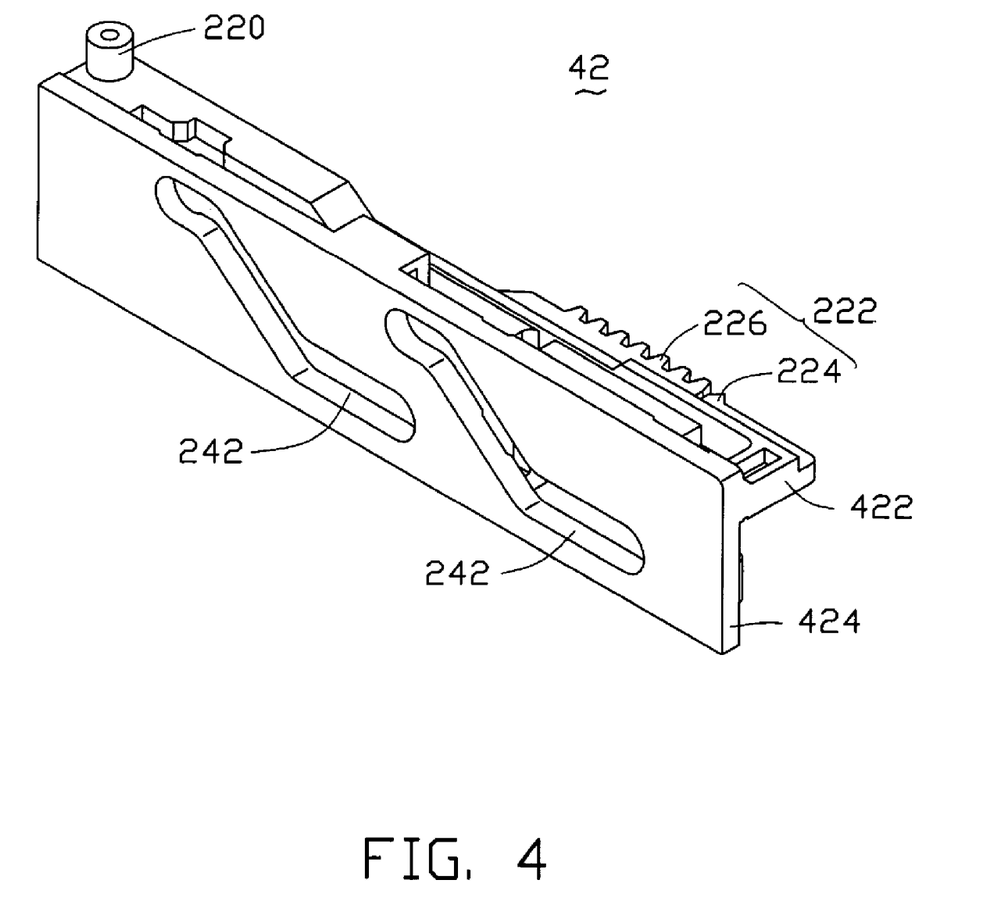
FIG. 4 is an isometric view of the cam slider of FIG. 3.
Figure 5:
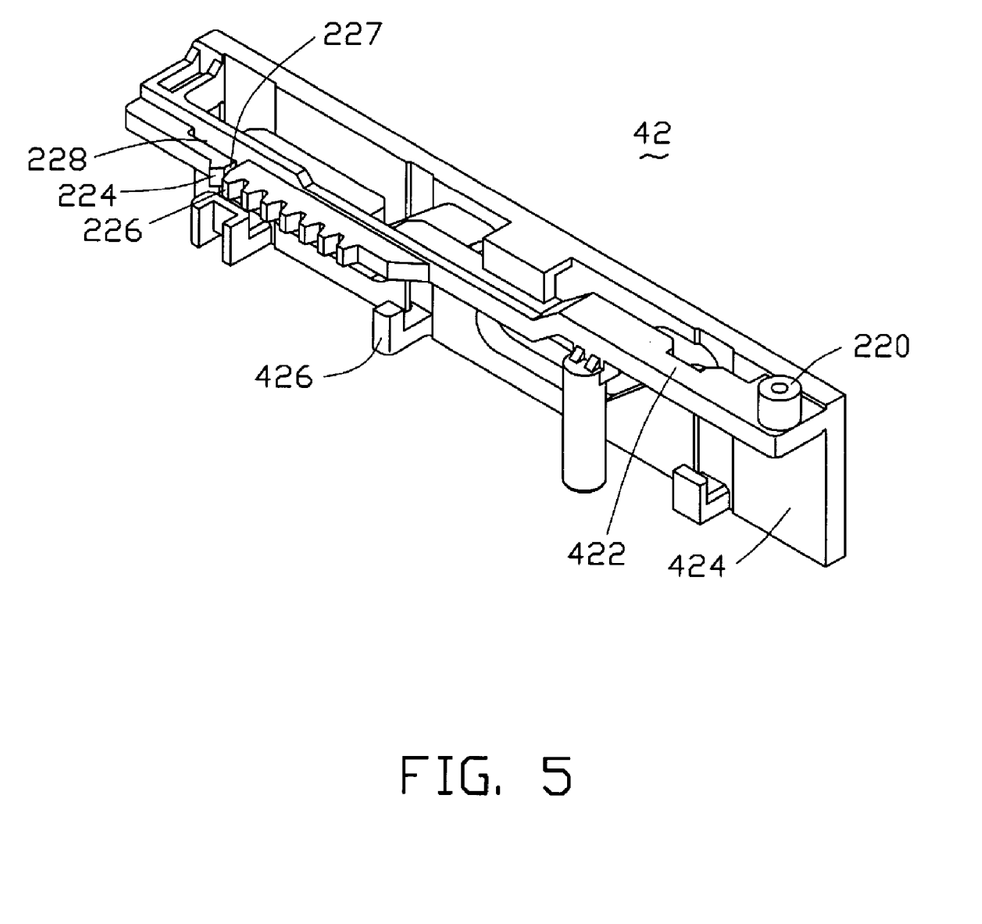
FIG. 5 is similar to FIG. 3, but viewed from another aspect.

Referring also to FIG. 4 and FIG. 5, the loading system 4 includes a cam slider 42 connected with a loading bracket 44. The cam slider 42 is engageable with the fifth gear 382 of the third duplicate wheel 100. The loading bracket 44 mounts a traverse module (not shown) of the disc drive thereon. The cam slider 42 includes a horizontal portion 422 and a vertical portion 424. The horizontal portion 422 is mounted on a top of the front beam 22 of the frame 2, and the vertical portion 424 is attached to a rear of the front beam 22.

The horizontal portion 422 includes a guiding pin 220 and a toothed portion 222. The guiding pin 220 extends upwardly from an upper surface (not labeled) of the horizontal portion 422, near the driving motor 30. The guiding pin 220 is engageable in the guiding groove 14 of the tray 1. The toothed portion 222 is formed at a side of the horizontal portion 422. The toothed portion 222 is engageable with the fifth gear 382 of the transmission system 3. The toothed portion 222 includes a first rack segment 224 and a second rack segment 226. A tooth height of the first rack segment 224 is smaller than that of the second rack segment 226. The first rack segment 224 and the second rack segment 226 are spaced apart from each other by a notch 227. A slot 228 communicating with the notch 227 is defined behind the first rack segment 224, along a direction of a movement of the toothed portion 222. Due to the slot 228 defined behind the first rack segment 224, the first rack segment 224 can flexibly deform under an outside force.

The vertical portion 424 defines therethrough a pair of generally Z-shaped channels 242. The channels 242 each receive a post 442 (referring to FIG. 3) extending horizontally from the loading bracket 44. The engagement of the Z-shaped channels 242 and the posts 442 induces the loading bracket 44 to move up or down the traverse module, so as to load or unload a disc, as the cam slider 42 slides to the left or right.

Figure 6:
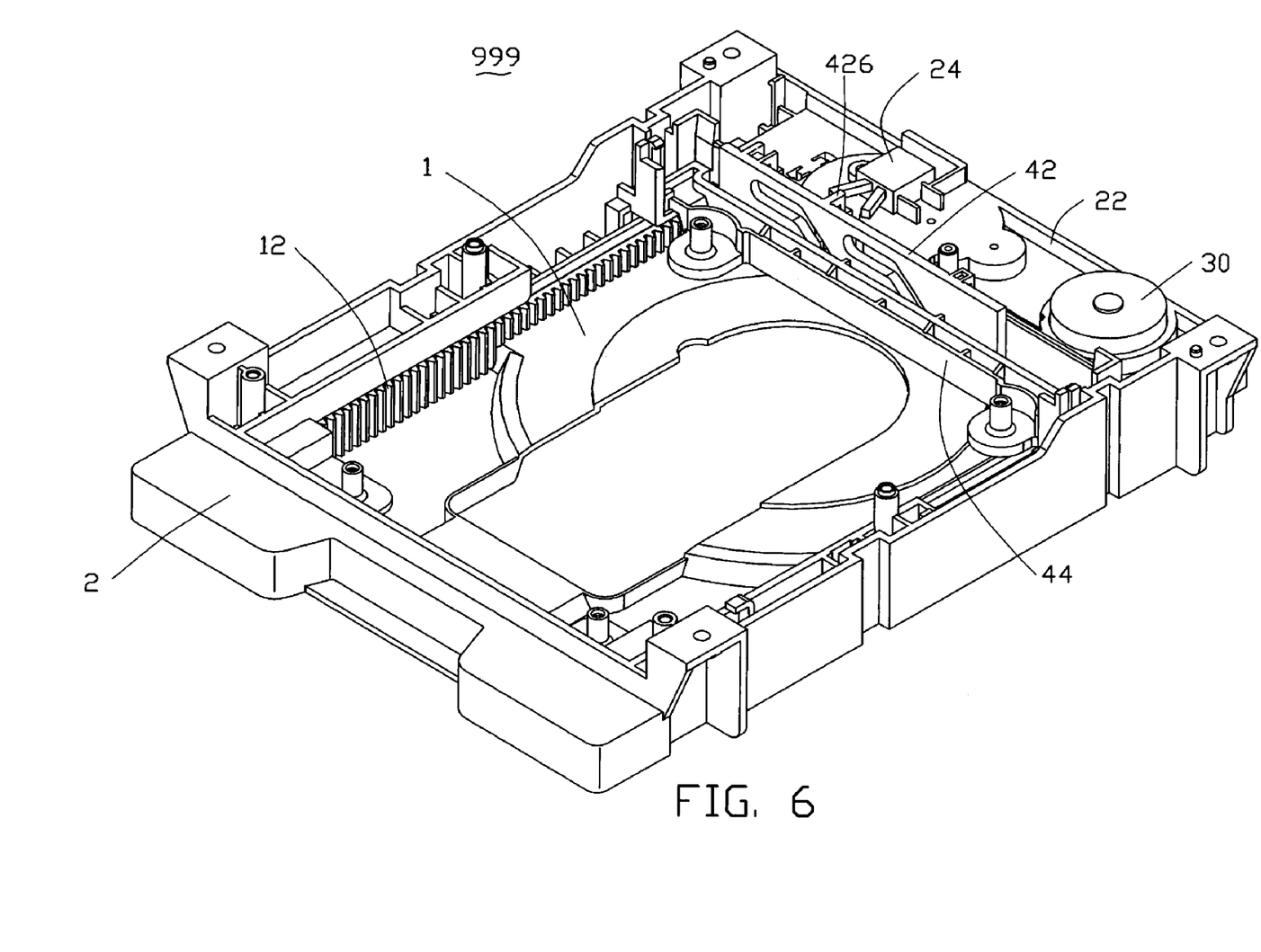
FIG. 6 is an assembled, isometric view of the loading apparatus, viewed from an inverted aspect.

Referring to FIG. 6, a loading switch 24, which controls direction of rotation of the driving motor 30 of the transmission system 3, is attached to a bottom of the front beam 22. A switch pusher 426 is formed on the vertical portion 424 of the cam slider 42, for activating the loading switch 24 to switch between a first rotation direction and a second rotation direction, i.e. between a loading direction and an unloading direction.

Referring to FIG. 1 and FIG. 6, when loading a disc to the disc drive, the disc is placed on the tray 1 of the loading apparatus 999. The driving motor 30 is activated, and a motive force is output to the first pulley 320 of the first transmission unit 32. The motive force is sequentially transmitted to the first duplicate gear 60, the second duplicate gear 80, the third duplicate gear 100, and the sixth gear 384. Due to the engagement of the rack rail 12 of the tray 1 and the sixth gear 384, the tray 1 with the disc thereon is driven to move towards the frame 2.

As the tray 1 moves into the frame 2, the guiding pin 220 of the cam slider 42 in the guiding groove 14 gradually moves from the longitudinal portion 146 to the inclined portion 144. This causes the cam slider 42 to move left, and the first rack segment 224 of the toothed portion 222 engages with the fifth gear 382 in advance of the second rack segment 226. If the fifth gear 382 meshes properly with the first rack segment 224, the fifth gear 382 then successively meshes with the second rack segment 226. If a conflict of teeth of the fifth gear 382 and the first rack segment 224 occurs, the first rack segment 224 is flexibly deformed towards the cam slider 42. That is, if a tooth of the fifth gear 382 conflicts with a tooth of the first rack segment 224, the first rack segment 224 is forced to retreat toward the slot 228 therebehind. Accordingly, a relative displacement between the fifth gear 382 and the first rack segment 224 occurs.

After that, the second rack segment 226 can successfully mesh with the fifth gear 382, and engages smoothly and evenly with the fifth gear 382. The cam slider 42 moves on under the engagement of the fifth gear 382 and the second rack segment 226. The loading bracket 44 lifts up following sliding of the cam slider 42, until the cam slider 42 slides to a predetermined position, where the switch pusher 426 pushes the loading switch 24 to cut off the power supply of the driving motor 30. In this position, the tray 1 wholly enters the frame 2, and the loading bracket 44 lifts up to a highest location to load the disc.

As described above, the first rack segment 224 of the loading apparatus 999 overcomes the misalignment of teeth, and supplies a proper engagement to the second rack segment 226. This configuration of toothed portion 222 can also be applied to other rack and gear units, or even gear and pinion units.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A loading apparatus for a disc drive, comprising:
   a tray for carrying a disc thereon, the tray including a rack rail thereon;
   a frame slidably supporting the tray thereon;
   a transmission system mounted on the frame, the transmission system comprising a driving motor for outputting a driving force, and at least one gear unit for transmitting the driving force, the gear unit engaging with the rack rail of the tray; and
   a loading system attached to the frame, the loading system comprising a slider with a toothed portion engageable with the gear unit, the toothed portion comprising a first rack segment and a second rack segment, the first rack segment defining a slot at a back thereof, the first and second rack segments being configured such that the first rack segment engages with the gear unit in advance of the second rack segment when the toothed portion and the gear unit mesh, and the first rack segment is flexibly deformed when a conflict of gear teeth of the gear unit and the first rack segment occurs.

2. The loading apparatus as claimed in claim 1, wherein the first rack segment and the second rack segment are spaced apart by a notch defined therein, and the notch communicates with the slot.

3. The loading apparatus as claimed in claim 1, wherein the transmission system comprises a pulley unit connected to the driving motor to transmit the driving force of the driving motor.

4. The loading apparatus as claimed in claim 3, wherein the at least one gear unit engages with the pulley unit to further transmit the driving force.

5. The loading apparatus as claimed in claim 1, wherein the loading system further comprises a loading bracket engaging with the slider, and the loading bracket moves up or down as the slider slides.

6. The loading apparatus as claimed in claim 5, wherein the slider defines a pair of Z-shaped channels, and the loading bracket forms a pair of posts engaging in the Z-shaped channels, respectively.

7. The loading apparatus as claimed in claim 1, wherein a guiding pin extends from the slider, the tray defines a guiding groove, and the guiding pin is engaged in the guiding groove.

8. The loading apparatus as claimed in claim 7, wherein the guiding groove is divided into a transverse portion, a longitudinal portion, and a inclined portion interconnecting the transverse portion and the longitudinal portion.

9. A loading apparatus for a disc drive, the disc drive including a traverse module for loading a disc thereon and reading from or recording to the disc, the loading apparatus comprising:
  a gear for transmitting a motive force of a driving motor; and
  a slider for lifting the traverse module up to load the disc, the slider forming a toothed portion engageable with the gear, the toothed portion comprising a first rack segment and a second rack segment, the first rack segment being flexibly deformable so as to overcome a conflict of alignment of gear teeth of the gear and the first rack segment when such conflict occurs.

10. The loading apparatus as claimed in claim 9, wherein the first rack segment and the second rack segment are spaced apart from each other by a notch defined therebetween.

11. The loading apparatus as claimed in claim 10, wherein the first rack segment defines a slot therebehind, along a direction of a movement of the first rack segment.

12. The loading apparatus as claimed in claim 11, wherein the notch and the slot communicate with each other.

13. A loading apparatus for a disc drive, comprising:
  a frame;
  a tray slidably mounted on the frame, the tray being configured for carrying a disc thereon;
  a transmission system mounted on the frame, the transmission system comprising a driving motor for outputting a driving force, and at least one gear unit for transmitting the driving force to drive the tray to slide; and
  a loading system attached to the frame, the loading system comprising a slider having a toothed portion engageable with the gear unit to move the loading system, the toothed portion comprising a first rack segment and a second rack segment, the toothed portion being configured for cooperating with the gear unit in a manner that when the gear unit conflicts with the first rack segment, the first rack segment retreats to allow the gear unit to pass to mesh with the second rack segment.

14. The loading apparatus of claim 13, wherein the tooth height of the second rack segment is greater than that of the first rack segment.

15. The loading apparatus of claim 13, wherein the first and second rack segments are spaced by a notch.

16. The loading apparatus of claim 13, wherein the first rack segment is deformable.

* * * * *